(12) United States Patent
Taniguchi et al.

(10) Patent No.: US 11,223,313 B2
(45) Date of Patent: Jan. 11, 2022

(54) INVERTER CONTROL DEVICE AND MOTOR DRIVE SYSTEM

(71) Applicants: Toshiba Infrastructure Systems & Solutions Corporation, Kawasaki (JP); Toshiba Industrial Products and Systems Corporation, Kawasaki (JP)

(72) Inventors: Shun Taniguchi, Tokyo (JP); Kazuya Yasui, Tokyo (JP); Tomoaki Shigeta, Tokyo (JP)

(73) Assignees: Toshiba Infrastructure Systems & Solutions Corporation, Kanagawa (JP); Toshiba Industrial Products and Systems Corporation, Kanagawa (JP)

( * ) Notice: Subject to any disclaimer, the term of this patent is extended or adjusted under 35 U.S.C. 154(b) by 276 days.

(21) Appl. No.: 16/367,013

(22) Filed: Mar. 27, 2019

(65) Prior Publication Data
US 2019/0222158 A1    Jul. 18, 2019

Related U.S. Application Data

(63) Continuation of application No. PCT/JP2017/031001, filed on Aug. 29, 2017.

(30) Foreign Application Priority Data

Sep. 5, 2016   (JP) .............................. JP2016-172968

(51) Int. Cl.
*H02P 6/04*    (2016.01)
*H02P 27/06*    (2006.01)
(Continued)

(52) U.S. Cl.
CPC .............. *H02P 27/06* (2013.01); *H02M 7/48* (2013.01); *H02P 1/029* (2013.01); *H02P 6/18* (2013.01); *H02P 21/34* (2016.02); *H02P 25/08* (2013.01)

(58) Field of Classification Search
CPC ...... H02M 7/48; H02P 1/029; H02P 21/0021; H02P 21/34; H02P 25/08; H02P 27/06; H02P 6/18; H02P 6/183
(Continued)

(56) References Cited

U.S. PATENT DOCUMENTS 6,815,924 B1    11/2004    Iura et al.
8,519,649 B2 *    8/2013    Taniguchi ................. H02P 6/20
                                                          318/400.02
(Continued)

FOREIGN PATENT DOCUMENTS

EP    3168980 A1    5/2017
EP    3252942 A1    12/2017
(Continued)

OTHER PUBLICATIONS

International Search Report and Written Opinion issued in related PCT Application No. PCT/JP2017/031001 dated Nov. 28, 2017, 11 pages (with translation).

(Continued)

*Primary Examiner* — Eduardo Colon Santana
*Assistant Examiner* — Gabriel Agared
(74) *Attorney, Agent, or Firm* — Baker Botts L.L.P.

(57) ABSTRACT

A device according to an embodiment includes an inverter main circuit; a detector configured to detect a current of an output line of the inverter main circuit; a starting time controller comprising a rotational phase angle estimator configured to calculate, based on a current response value detected by the detector, a value corresponding to a rotational phase angle of a motor connected to the inverter main circuit in a stationary reference frame, and a rotational speed estimator configured to calculate a value corresponding to a rotational speed of the motor by using the value corresponding to the rotational phase angle when the inverter main (Continued)

circuit is started; and a regular time controller configured to calculate, with the value corresponding to the rotational speed as an initial value, an estimated rotational phase angle of the motor in a rotating reference frame.

13 Claims, 10 Drawing Sheets

(51) Int. Cl.
    *H02M 7/48*     (2007.01)
    *H02P 6/18*     (2016.01)
    *H02P 21/34*     (2016.01)
    *H02P 1/02*     (2006.01)
    *H02P 25/08*     (2016.01)

(58) Field of Classification Search
    USPC ................................................ 318/400.11
    See application file for complete search history.

(56) References Cited

U.S. PATENT DOCUMENTS

| | | | |
|---|---|---|---|
| 2003/0169012 A1 | 9/2003 | Nakazawa | |
| 2011/0285337 A1* | 11/2011 | Taniguchi | H02P 27/08 |
| | | | 318/400.34 |
| 2013/0049656 A1* | 2/2013 | Yasui | H02P 21/00 |
| | | | 318/400.02 |
| 2013/0106329 A1* | 5/2013 | Kato | H02P 21/18 |
| | | | 318/400.11 |
| 2014/0084821 A1 | 3/2014 | Pollock et al. | |
| 2015/0311845 A1 | 10/2015 | Nagata et al. | |
| 2017/0264227 A1 | 9/2017 | Shigeta et al. | |
| 2018/0191285 A1 | 7/2018 | Shigeta et al. | |

FOREIGN PATENT DOCUMENTS

| | | |
|---|---|---|
| JP | 2000-228888 A | 8/2000 |
| JP | 2002-272198 A | 9/2002 |
| JP | 2003-259699 A | 9/2003 |
| JP | 2003-299381 A | 10/2003 |
| JP | 3508982 B2 | 3/2004 |
| JP | 2004-187396 A | 7/2004 |
| JP | 3636340 B2 | 4/2005 |
| JP | 3692085 B2 | 9/2005 |
| JP | 3719910 B2 | 11/2005 |
| JP | 4139934 B2 | 8/2008 |
| JP | 2009-112081 A | 5/2009 |
| JP | 5534935 B2 | 7/2014 |
| JP | 2017-046456 A | 3/2017 |
| WO | 2016/121237 A1 | 8/2016 |

OTHER PUBLICATIONS

Extended European Search Report issued in related European Patent Application No. 17846506.8 dated Mar. 19, 2020, 9 pages.

\* cited by examiner

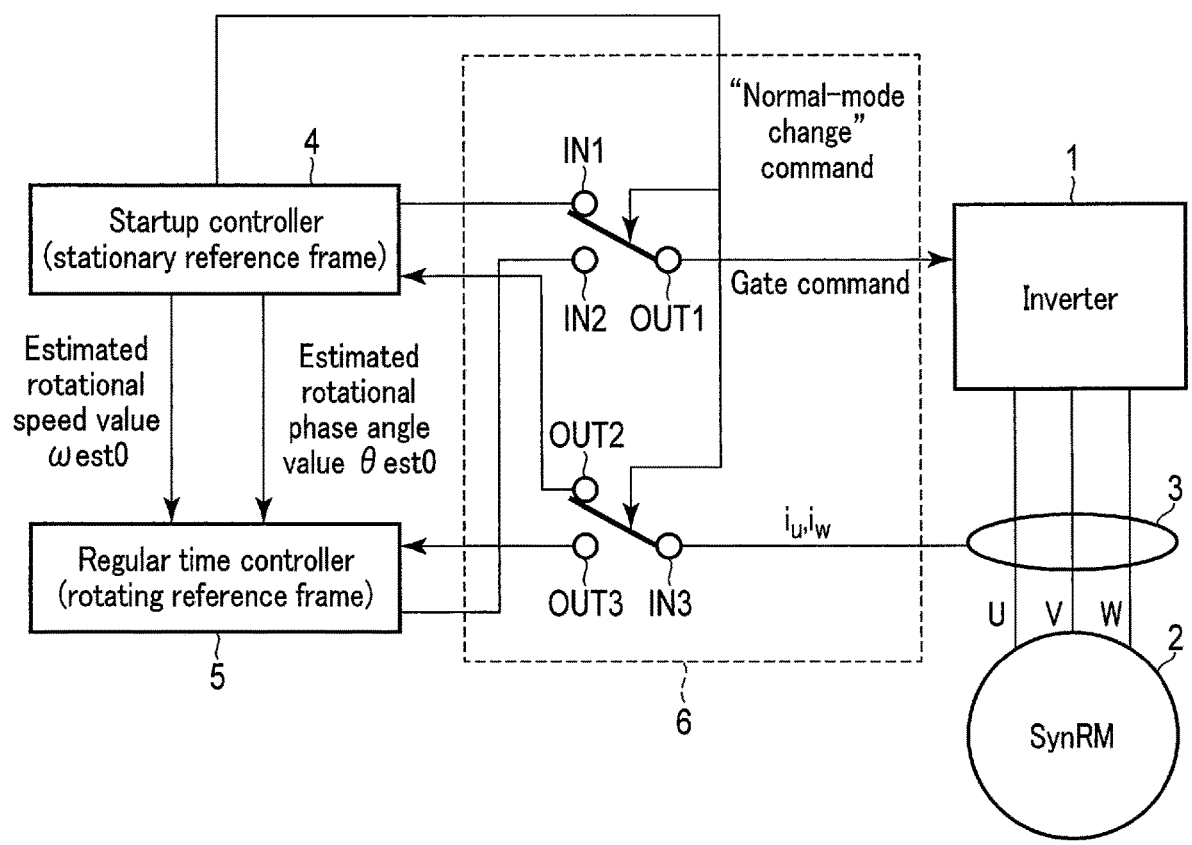
F I G. 1

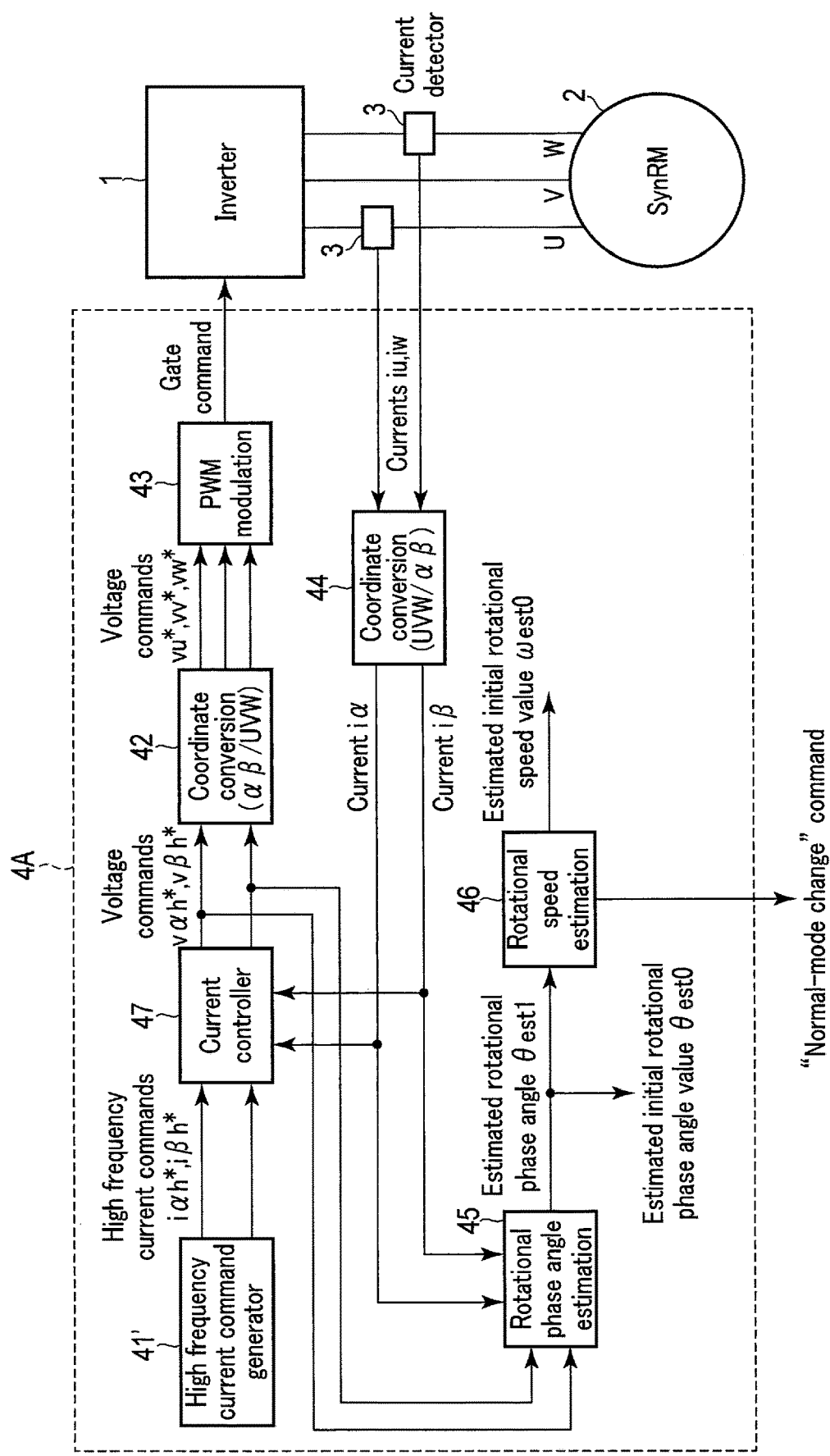
F I G. 7

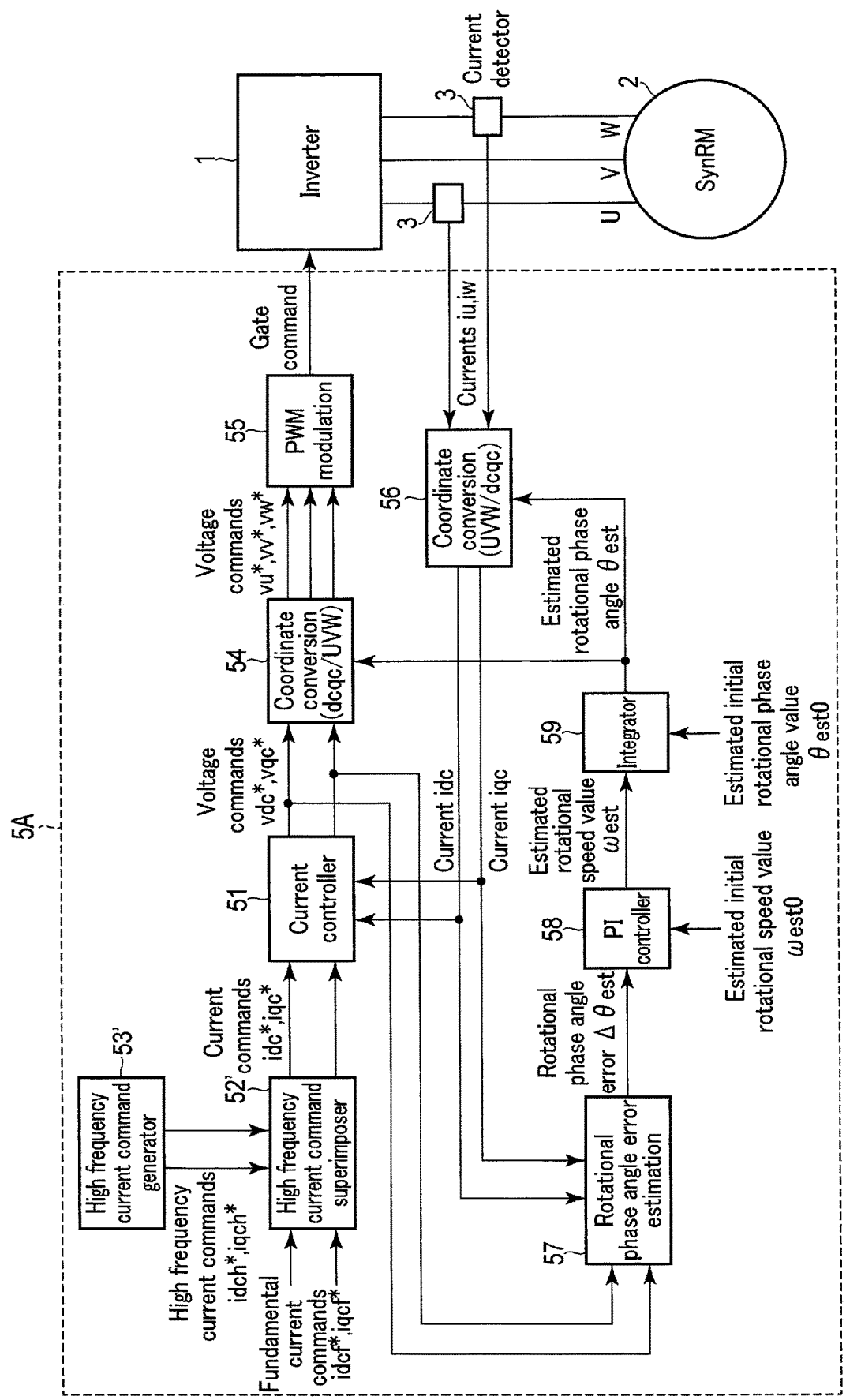
F I G. 8

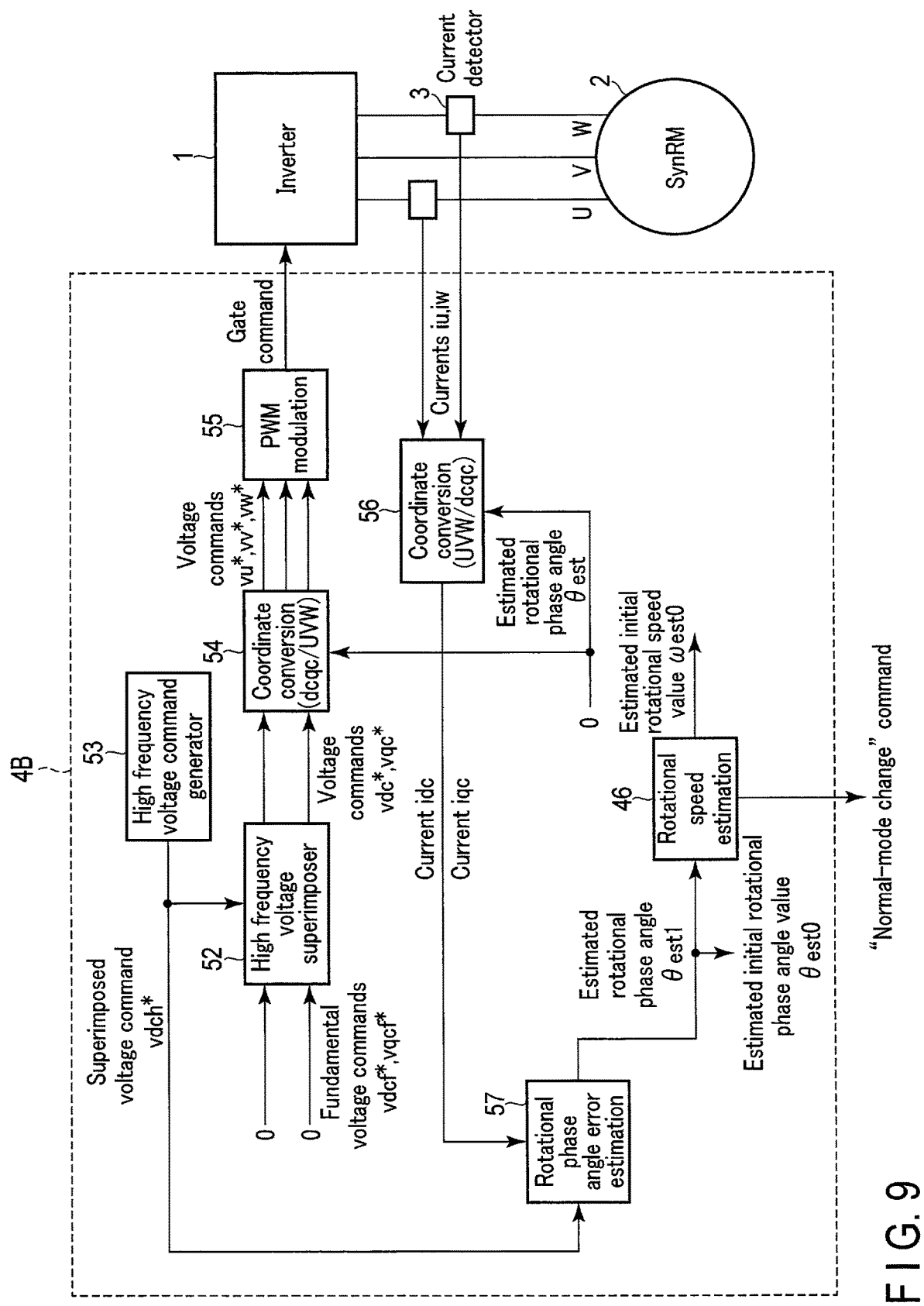
F I G. 9

INVERTER CONTROL DEVICE AND MOTOR DRIVE SYSTEM

CROSS REFERENCE TO RELATED APPLICATIONS

This application is a Continuation Application of PCT Application No. PCT/JP2017/031001, filed Aug. 29, 2017 and based upon and claiming the benefit of priority from Japanese Patent Application No. 2016-172968, filed Sep. 5, 2016, the entire contents of all of which are incorporated herein by reference.

FIELD

Embodiments described herein relate generally to an inverter control device and a motor drive system.

BACKGROUND

In an inverter device for controlling a motor, a sensorless control method that does not use a rotational phase angle sensor such as a resolver/encoder has been proposed to reduce size, weight, cost, and to increase reliability.

For example, a method of estimating the rotational phase angle using voltage information generated by a no-load magnetic flux interlinked to a winding, and a sensorless method of using high frequency current information generated from a rotor salient pole by superimposing a high frequency voltage have been proposed.

In inverter devices used for railroads or industrial applications, the rotational phase angle when starting the inverter from a coasting operation, a momentary power failure, or the like must be estimated. For this case, a method of controlling switching patterns of the inverter device when restarting, and estimating the rotor position by observing the current generated by short-circuiting the winding, and a method of suppressing a current generated by a magnet-induced voltage to zero, and using the so-generated feature quantity to estimate the rotational phase angle have been proposed.

Another method proposed is geared towards free-run restarts in Permanent Magnet Synchronous Motors (PMSMs), in which the inverter is switched so that a non-zero voltage vector is output, and in which the rotational phase angle is estimated by a single formula that does not take the motor speed into account.

For example, when estimating the rotational phase angle of a Synchronous Reluctance Motor (SynRM) that does not use a permanent magnet, applying a rotational phase angle estimation in which a no-load induced voltage is utilized is difficult, since the no-load induced voltage is small.

Also, although the rotational phase angle during a low-speed rotation can be accurately estimated by using the method of estimating the rotational phase angle through superimposing the high frequency voltages, the rotational phase angle during a high speed rotation has been difficult to estimate because it is based on the premise that the basic wave frequency is sufficiently small with regard to the frequency of the superimposed high frequency voltage.

BRIEF DESCRIPTION OF THE DRAWINGS

FIG. 1 is a diagram schematically showing a configuration example of an inverter control device and a motor drive system of a first embodiment.

FIG. 7 is a block diagram describing another example of the startup controller for the inverter control device and the motor drive system of the first embodiment.

FIG. 8 is a block diagram describing another example of the regular time controller for the inverter control device and the motor drive system of the first embodiment.

FIG. 9 is a block diagram schematically showing a configuration example of the startup controller for the inverter control device and the motor drive system of a second embodiment.

DETAILED DESCRIPTION

Figure 2:
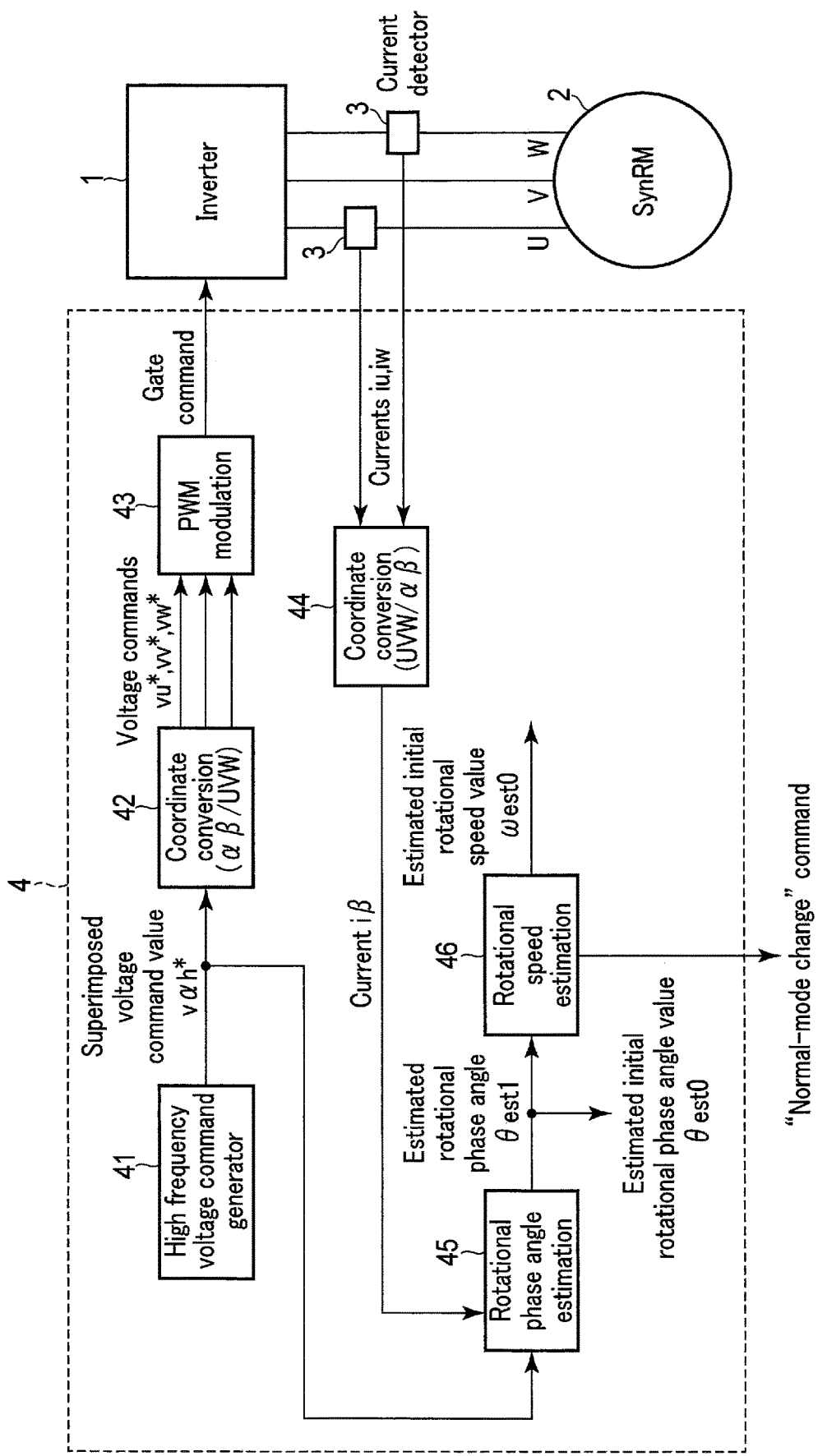
FIG. 2 is a block diagram schematically showing a configuration example of a startup controller for the inverter control device and the motor drive system of the first embodiment.

An inverter control device according to an embodiment comprises an inverter main circuit; a current detector configured to detect a current of an output line of the inverter main circuit; a startup controller comprising a rotational phase angle estimator configured to calculate, based on a current response value detected by the current detector, a value corresponding to a rotational phase angle of a motor connected to the inverter main circuit in a stationary reference frame, and a rotational speed estimator configured to calculate a value corresponding to a rotational speed of the motor by using the value corresponding to the rotational phase angle when the inverter main circuit is started; and a regular time controller configured to calculate, with the value corresponding to the rotational speed as an initial value, an estimated rotational phase angle of the motor in a rotating reference frame.

Hereinafter, the inverter control device and the motor drive system of the embodiments will be described with reference to the drawings.

FIG. 1 is the diagram schematically showing the configuration example of the inverter control device and the motor drive system of the first embodiment.

The motor drive system of this embodiment is configured to drive a motor 2, and comprises the motor 2 and the inverter control device. The inverter control device comprises an inverter 1, a current detector 3, a startup controller 4, a regular time controller 5, and a switcher 6.

The motor 2 is, for example, a Synchronous Reluctance Motor (SynRM) including a stator and a rotor. The motor 2 is driven by alternating currents of three phases supplied from the inverter 1.

The inverter 1 comprises an inverter main circuit that comprises a DC power source (DC load) and two switching elements of each of: a U-phase, a V-phase, and a W-phase (none of these elements are shown). The two switching elements of each of the phases are connected in series between a DC line connected to a positive electrode of the DC power source and a DC line connected to a negative electrode of the DC power source. The switching elements of the inverter 1 are controlled by a gate command received from the switcher 6. The inverter 1 is a three-phase AC inverter configured to output a U-phase current iu, a V-phase current iv, and a W-phase current iw to the motor 2 In other words, an AC load. The inverter 1 can further charge the DC power source with the electric power generated by the motor 2.

The current detector 3 is configured to detect, among the currents of three phases (the U-phase current iu, the V-phase current iv, and the W-phase current iw), response values of currents of at least two phases (for example, the U-phase current iu and the W-phase current iw). The current response values detected by the current detector 3 are supplied to the startup controller 4 or the regular time controller 5 via the switcher 6.

The switcher 6 is configured to switch supply paths for a gate command output from the startup controller 4 and a gate command output from the regular time controller 5 to the inverter 1. The switcher 6 is further configured to switch supply paths for the current response values iu, iw detected by the current detector 3 to either the startup controller 4 or the regular time controller 5.

The switcher 6 comprises a first switch 61 and a second switch 62. Operation of the first switch 61 and second switch 62 are controlled by, for example, a "normal-mode change" command supplied from the startup controller 4.

The first switch 61 comprises a first input unit IN1, a second input unit IN2, and a first output unit OUT1. The gate command output from the startup controller 4 is input to the first input unit IN1. The gate command output from the regular time controller 5 is input to the second input unit IN2. The first output unit OUT1 is electrically connected to a line supplying the gate command to each of the two switching elements of each of the phases of the inverter 1.

The first switch 61 electrically connects the first input unit IN1 and the first output unit OUT1 when the "normal-mode change" command is at a low (L) level, and electrically connects the second input unit IN2 and the first output unit OUT1 when the "normal-mode change" command is at a high (H) level.

The second switch 62 comprises a third input unit IN3, a second output unit OUT2, and a third output unit OUT3. The current response values iu, iw are input from the current detector 3 to the third input unit IN3. The second output unit OUT2 is electrically connected to a line supplying the current response values iu, iw to a coordinate converter 44 (to be described later) of the startup controller 4. The third output unit OUT3 is electrically connected to a line supplying the current response values iu, iw to a coordinate converter 56 (to be described later) of the regular time controller 5.

The second switch 62 electrically connects the third input unit IN3 and the second output unit OUT2 when the "normal-mode change" command is at the low (L) level, and electrically connects the third input unit IN3 and the third output unit OUT3 when the "normal-mode change" command is at the high (H) level.

The startup controller 4 is configured to, when starting the inverter 1 (for example, when starting the motor 2 from free-run), calculate an estimated rotational phase angle θest1 (value corresponding to a rotational phase angle value θ) by using a high frequency voltage command in which a high frequency voltage command in a stationary reference frame is superimposed on a voltage command, and a high frequency current value (current response value) output from the inverter 1 when the motor 2 is applied with a high frequency voltage, and use it to calculate an estimated initial rotational speed value ωest0 (value corresponding to a rotational speed ω). As will be described later, the estimated rotational phase angle θest1 (value corresponding to the rotational phase angle value θ) includes an estimated initial rotational phase angle value θest0.

The time of start of the inverter 1 is when the inverter control device starts driving the inverter 1 when, for example, a user presses a start button. In a case of performing a sensorless control of the inverter, the inverter control device does not recognize the rotor's rotational speed at the point of starting the inverter 1. Therefore, when the inverter 1 is started up, the motor 2 may be in a free-run state or in a state in which a rotation of the motor 2 is stopped.

The startup controller 4 further outputs a "normal-mode change" command to the switcher 6. The "normal-mode change" command is at the low (L) level when the inverter control device and the motor drive system are activated by an external start command. The startup controller 4 raises, in synchronization with the point of supplying the estimated initial rotational speed value ωest0 to the regular time controller 5, the "normal-mode change" command from the low (L) level to the high (H) level.

Note that when the inverter main circuit is stopped (for example, when the user pushes a stop button or the inverter main circuit is stopped by an operation to protect in case of malfunction), the start control section 4 changes the "normal-mode change" command from the high (H) level to the low (L) level.

The regular time controller 5 is configured to control the operation of the motor 2 by superimposing a high frequency voltage command in a rotating reference frame on a voltage command, with the estimated initial rotational phase angle value θest0 and the estimated initial rotational speed value ωest0 supplied to the regular time controller 5 as initial values, and calculating an estimated rotational phase angle θest by using the high frequency current value (current response value) output from the inverter 1 when the motor 2 is applied with a high frequency voltage.

FIG. 2 is the block diagram schematically showing the configuration example of the startup controller for the inverter control device and the motor drive system of the first embodiment.

The startup controller 4 comprises a high frequency voltage command generator 41, coordinate converters 42 and 44, a PWM modulator 43, a rotational phase angle estimator 45, and a rotational speed estimator 46.

The high frequency voltage command generator 41 generates a high frequency voltage command $v\alpha h^*$ of a $\alpha\beta$-fixed reference frame.

Figure 3:
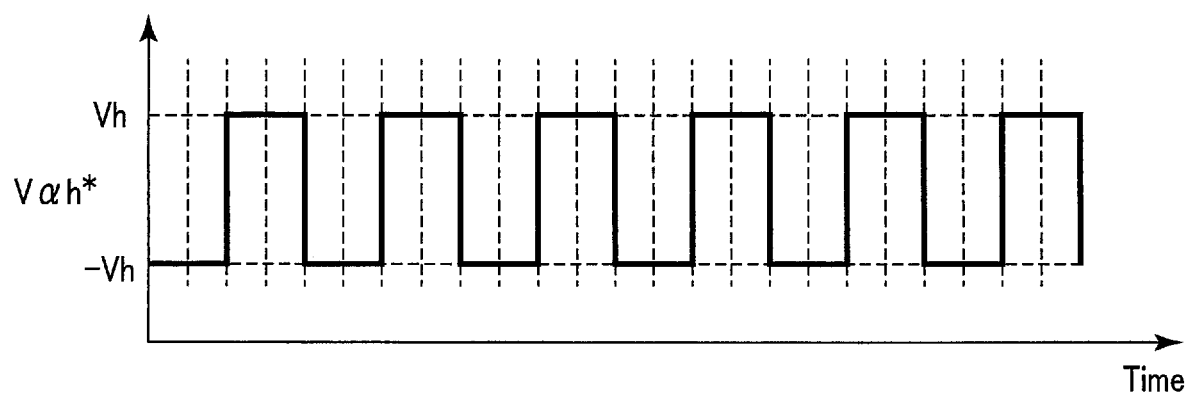
FIG. 3 is a diagram describing an example of a high frequency voltage command output from a high frequency voltage command generator of the startup controller.

FIG. 3 is a diagram describing an example of a high frequency voltage command output from the high frequency voltage command generator of the startup controller.

The high frequency voltage command $v\alpha h^*$, as shown in FIG. 3, is, for example, a high frequency voltage command oscillating between Vh [V] and −Vh [V]. Note that a frequency of the superimposed high frequency signal twice or more the maximum number of revolutions of the motor 2 connected to the inverter main circuit is a signal component that does not contribute to the rotation of the motor 2, which is why the high frequency signal to be superimposed is set at least to twice or more the maximum number of revolutions of the motor 2.

The coordinate converter 42 is a means of vector conversion configured to receive the high frequency voltage command vαh* in the αβ-fixed reference frame output from the high frequency voltage command generator 41, and perform coordinate conversion thereunto to convert them to voltage commands vu*, vv*, vw* in a three-phase fixed reference frame.

The PWM modulator 43 is configured to generate a gate signal of the switching elements of each of the phases of the inverter 1, based on a result of comparing the voltage command (modulation factor command) values vu*, vv*, vw* output from the coordinate converter 42 against a triangular wave, and output it.

The coordinate converter 44 is a means of vector conversion configured to receive the current response values iu, iw in the three-phase fixed reference frame detected by the current detector 3, and perform coordinate conversion thereunto to convert them to a current response value iβ in the αβ-fixed reference frame.

The rotational phase angle estimator 45 is configured to calculate, from the current response value iβ output from the coordinate converter 44 and a superimposed voltage command (high frequency voltage command) vαh* generated by the high frequency voltage command generator 41, the estimated rotational phase angle θest1 of the motor 2.

This can be expressed, for example, by following Formula (1) which considers a voltage equation model of the motor 2 in the stationary reference frame.

[Mathematical 1]

$$\begin{bmatrix} v_\alpha \\ v_\beta \end{bmatrix} = R \begin{bmatrix} i_\alpha \\ i_\beta \end{bmatrix} + \begin{bmatrix} L_0 + L_1 \cos 2\theta & L_1 \sin 2\theta \\ L_1 \sin 2\theta & L_0 - L_1 \cos 2\theta \end{bmatrix} \begin{bmatrix} pi_\alpha \\ pi_\beta \end{bmatrix}, \quad \text{Formula (1)}$$

wherein $$L_0 = \frac{L_d + L_q}{2}, \quad L_1 = \frac{L_d - L_q}{2}.$$

Note that in the above Formula (1), piα is a differentiated value of iα, and piβ is a differentiated value of iβ.

By extracting only high frequency components from the above Formula (1), only current differentials which can be expressed by following Formula (2) are obtained.

[Mathematical 2]

$$\begin{bmatrix} v_{\alpha hf} \\ v_{\beta hf} \end{bmatrix} = \begin{bmatrix} L_{00} & L_{01} \\ L_{10} & L_{11} \end{bmatrix} \begin{bmatrix} pi_{\alpha hf} \\ pi_{\beta hf} \end{bmatrix} \quad \text{Formula (2)}$$

Note that in the above Formula (2), the suffix "hf" means the high frequency component.

In addition, inductance matrices L00, L01, L10, L11 can be expressed by following Formula (3).

[Mathematical 3]

$$\begin{bmatrix} L_{00} & L_{01} \\ L_{10} & L_{11} \end{bmatrix} \begin{bmatrix} L_0 + L_1 \cos 2\theta & L_1 \sin 2\theta \\ L_1 \sin 2\theta & L_0 - L_1 \cos 2\theta \end{bmatrix} \quad \text{Formula (3)}$$

Here, by transforming the Formula (2), Formula (4) is obtained.

[Mathematical 4]

$$\begin{bmatrix} pi_{\alpha hf} \\ pi_{\beta hf} \end{bmatrix} = \frac{1}{L_d L_q} \begin{bmatrix} L_{11} & -L_{01} \\ -L_{10} & L_{00} \end{bmatrix} \begin{bmatrix} v_{\alpha hf} \\ v_{\beta hf} \end{bmatrix} \quad \text{Formula (4)}$$

In case the high frequency voltage is superimposed only in the α-direction, vβhf becomes 0, so the Formula (4) can be expressed by following Formula (5).

[Mathematical 5]

$$\begin{bmatrix} pi_{\alpha hf} \\ pi_{\beta hf} \end{bmatrix} = \frac{1}{L_d L_q} \begin{bmatrix} L_{11} \\ -L_{10} \end{bmatrix} v_{\alpha hf} \quad \text{Formula (5)}$$

By assigning the Formula (3) to the Formula (5), Formula (6) is obtained.

[Mathematical 6]

$$\begin{bmatrix} pi_{\alpha hf} \\ pi_{\beta hf} \end{bmatrix} = \frac{1}{L_d L_q} \begin{bmatrix} L_0 - L_1 \cos 2\theta \\ -L_1 \sin 2\theta \end{bmatrix} v_{\alpha hf} \quad \text{Formula (6)}$$

By focusing on piβhf in the Formula (6), Formula (7) is obtained.

[Mathematical 7]

$$\sin 2\theta = -\frac{L_d L_q}{L_1} \frac{pi_{\beta hf}}{v_{\alpha hf}} \quad \text{Formula (7)}$$

By solving θ in the Formula (7), Formula (8) is obtained.

[Mathematical 8]

$$\theta = -\frac{1}{2} \sin^{-1} \left( \frac{L_d L_q}{L_1} \frac{pi_{\beta hf}}{v_{\alpha hf}} \right) \quad \text{Formula (8)}$$

The rotational phase angle estimator 45 is configured to calculate the rotational phase angle value θ by using the above Formula (8), and set it as the estimated rotational phase angle θest1. However, it is assumed that vαhf is obtained by using the superimposed voltage command vαh*, and that piβhf is obtained by differentiating the current response value iβ. Note that the estimated rotational phase angle θest1 at the point at which the initial speed is calculated (point at which the "normal-mode change" command is raised from the low (L) level to the high (H) level) is output as the estimated initial rotational phase angle value θest0.

The rotational speed estimator 46 is configured to calculate the estimated initial rotational speed value ωest0 using the estimated rotational phase angle θest1 output from the rotational phase angle estimator 45.

The rotational speed estimator 46 counts the number of times the estimated rotational phase angle θest1 crosses zero from the beginning of the starting process until the end of a first predetermined period T1. Subsequently, when the count value is equal to or greater than the predetermined value, the rotational speed estimator 46 further counts the number of times the estimated rotational phase angle θest1 crosses zero from the beginning of the starting process until the end of a second predetermined period T2 (second predetermined period T2>first predetermined period T1).

In this embodiment, for example, the predetermined value to be compared against the count value is "2". In other words, when the value counted during the first predetermined period T1 is equal to or greater than the predetermined value (for example, 2), the rotational speed estimator 46 further counts the number of times that the rotational phase angle value θest1 estimated during the second predetermined period T2 crosses zero.

The rotational speed estimator 46 uses the number KT2 of times that the estimated rotational phase angle θest1 crosses zero from the start of the starting process (start of the first predetermined period T1) until the end of the second predetermined period T2 to calculate the following estimated initial rotational speed value ωest0. Because the number of times that the value θ crosses zero is two per cycle, the number is divided by 2.

$$\omega est0 = 2\pi \times (KT2 \div T2) \div 2 \qquad \text{Formula (9)}$$

On the other hand, when the number of times that the estimated rotational phase angle θest1 crosses zero during the first predetermined period T1 is less than the predetermined value (for example, two), the rotational speed estimator 46 sets the estimated initial rotational speed value ωest0 to zero. When, for example, the user presses the start button in a state in which the inverter 1 is stopped, so that the starting process of the inverter 1 is started, the number of times that the estimated rotational phase angle θest1 crosses zero during the first predetermined period T1 becomes less than the predetermined value (for example, two), and the estimated initial rotational speed value ωest0 becomes zero.

The rotational speed estimator 46 calculates, as described above, the estimated initial rotational speed value ωest0 and supplies the calculation result to the regular time controller 5. The rotational speed estimator 46 raises, in synchronization with the point of supplying the estimated initial rotational speed value ωest0 to the regular time controller 5, the "normal-mode change" command to the switcher 6 from the low (L) level to the high (H) level. Therefore, in synchronization with the point at which the estimated initial rotational speed value ωest0 is set as an initial value of a PI controller 58 of the regular time controller 5, the first switch 61 and the second switch 62 are switched, the current command values iu, iw are supplied to the regular time controller 5, and the gate command calculated by the regular time controller 5 is supplied to the inverter 1.

In this embodiment, the estimated initial rotational speed value ωest0 has been calculated by using the value (estimated rotational phase angle θest1) corresponding to the rotational phase angle value θ. However, with respect to the estimated initial rotational phase angle value θest0, the estimated initial rotational phase angle value θest0 does not have to be preset to the normal state controller 5, since its relevance to the initial rotational speed is low. In case the estimated initial rotational phase angle value θest0 is not preset to the regular time controller 5, the calculation process can be simplified, since piβhf in the above Formula (6) includes the component of sin 2θ, by counting the number of zero-crossings of piβhf to calculate the estimated initial rotational speed value ωest0.

Figure 4:
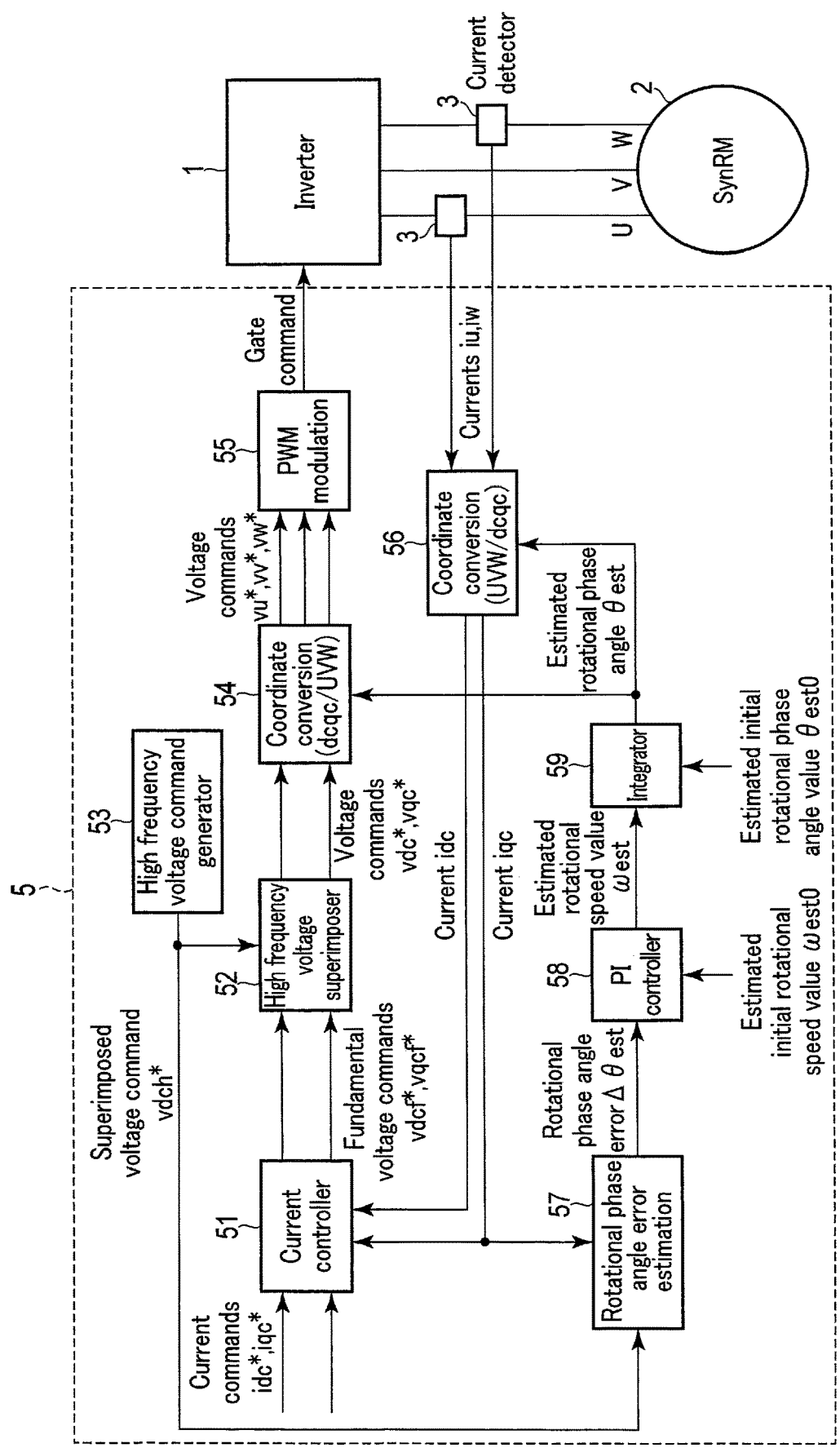
FIG. 4 is a block diagram schematically showing a configuration example of a regular time controller for the inverter control device and the motor drive system of the first embodiment.

FIG. 4 is the block diagram schematically showing the configuration example of the regular time controller for the inverter control device and the motor drive system of the first embodiment.

The regular time controller 5 comprises a current controller 51, a high frequency voltage superimposer 52, a high frequency voltage command generator 53, coordinate converters 54 and 56, a PWM modulator 55, a rotational phase angle error estimator 57, the PI controller 58, and an integrator 59.

The current controller 51 is configured to receive current response values idc, iqc and current commands idc*, iqc* in a dcqc-rotating reference frame, calculate fundamental voltage commands vdcf*, vqcf* so that the difference between the current response values idc, iqc and the current commands idc*, iqc* becomes zero, and output them.

The high frequency voltage command generator 53 is configured to generate a superimposed voltage command vdch* in the dcqc-rotating reference frame.

Figure 5:
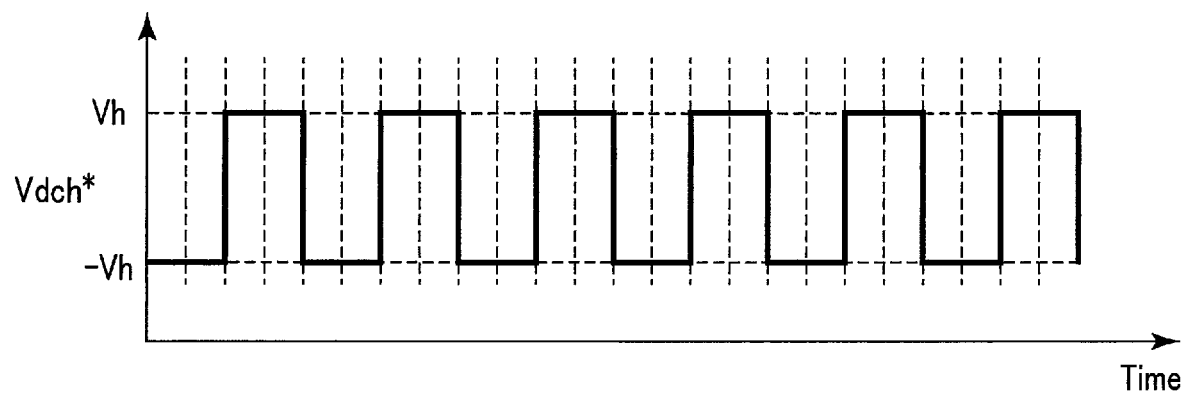
FIG. 5 is a diagram describing an example of a superimposed voltage command output from the high frequency voltage command generator of the regular time controller.

FIG. 5 is the diagram describing the example of the superimposed voltage command output from the high frequency voltage command generator of the regular time controller.

The superimposed voltage command vdch* is, as shown in, for example, FIG. 5, a high frequency voltage command oscillating between Vh [V] and −Vh [V].

The high frequency voltage superimposer 52 is configured to add the superimposed voltage command vdch* to the fundamental voltage commands vdcf*, vqcf* to generate voltage commands vdc*, vqc*.

The coordinate converter 54 is a means of vector conversion configured to perform, by using the estimated rotational phase angle θest, coordinate conversion unto the voltage commands vdc*, vqc* in the dcqc-rotating reference frame to convert them into the voltage commands vu*, vv*, vw* in the three-phase fixed reference frame.

The PWM modulator 55 is configured to generate a gate signal of the switching elements of each of the phases of the inverter 1, based on a result of comparing the voltage command (modulation rate command) values vu*, vv*, vw* output from the coordinate converter 54 against a triangular wave, and output it.

The coordinate converter 56 is a means of vector conversion configured to receive the estimated rotational phase angle θest and the current response values iu, iw detected by the current detector 3, and perform, by using the estimated rotational phase angle θest, coordinate conversion unto the current response values iu, iw in the three-phase fixed reference frame to convert them to the current response values idc, iqc in the dcqc-rotating reference frame.

This can be expressed, for example, by following Formula (10) which considers a voltage equation model of the motor 2 in the rotating reference frame.

[Mathematical 9]

$$\begin{bmatrix} v_d \\ v_q \end{bmatrix} = R \begin{bmatrix} i_d \\ i_q \end{bmatrix} + \begin{bmatrix} L_0 + L_1\cos2\Delta\theta & L_1\sin2\Delta\theta \\ L_1\sin2\Delta\theta & L_0 - L_1\cos2\Delta\theta \end{bmatrix} \begin{bmatrix} pi_d \\ pi_q \end{bmatrix} \qquad \text{Formula (10)}$$

$$\text{wherein } L_0 = \frac{L_d + L_q}{2}, L_1 = \frac{L_d - L_q}{2}.$$

By extracting only the high frequency components from the above Formula (10), only the current differentials which can be expressed by following Formula (11) are obtained.

[Mathematical 10]

$$\begin{bmatrix} v_{dhf} \\ v_{qhf} \end{bmatrix} = \begin{bmatrix} L_0 + L_1\cos2\Delta\theta & L_1\sin2\Delta\theta \\ L_1\sin2\Delta\theta & L_0 - L_1\cos2\Delta\theta \end{bmatrix} \begin{bmatrix} pi_{dhf} \\ pi_{qhf} \end{bmatrix} \quad \text{Formula (11)}$$

Here, by transforming the Formula (11), Formula (12) is obtained.

[Mathematical 11]

$$\begin{bmatrix} pi_{dhf} \\ pi_{qhf} \end{bmatrix} = \frac{1}{L_d L_q}\begin{bmatrix} L_0 - L_1\cos2\Delta\theta & -L_1\sin2\Delta\theta \\ -L_1\sin2\Delta\theta & L_0 + L_1\cos2\Delta\theta \end{bmatrix}\begin{bmatrix} v_{dhf} \\ v_{qhf} \end{bmatrix} \quad \text{Formula (12)}$$

Furthermore, when the high frequency voltage is superimposed only in the d-direction, vqhf becomes 0, so Formula (12) can be expressed by following Formula (13).

[Mathematical 12]

$$\begin{bmatrix} pi_{dhf} \\ pi_{qhf} \end{bmatrix} = \frac{1}{L_d L_q}\begin{bmatrix} L_0 - L_1\cos2\Delta\theta \\ -L_1\sin2\Delta\theta \end{bmatrix} v_{dhf} \quad \text{Formula (13)}$$

By focusing on piqhf in the above Formula (13), Formula (14) is obtained.

[Mathematical 13]

$$\sin2\Delta\theta = -\frac{L_d L_q}{L_1}\frac{pi_{qhf}}{v_{dhf}} \quad \text{Formula (14)}$$

By solving $\Delta\theta$ in the Formula (14), Formula (15) is obtained.

[Mathematical 14]

$$\Delta\theta = -\frac{1}{2}\sin^{-1}\left(\frac{L_d L_q}{L_1}\frac{pi_{qhf}}{v_{dhf}}\right) \quad \text{Formula (15)}$$

The rotational phase angle error estimator 57 is configured to calculate, by using the Formula (15) above, a rotational phase angle error Δθest between the rotational phase angle value and the estimated rotational phase angle θest of the motor 2 used for the coordinate conversion of the rotating reference frame, and output it. However, it is assumed that vdhf output from the high frequency voltage command generator 53 is obtained by using the superimposed voltage command vdch*, and that piqhf is obtained by differentiating the current response value iqc output from the coordinate converter 56.

The PI controller 58 is configured to receive the rotational phase angle error Δθest and the estimated initial rotational speed value ωest0, calculate, by using the estimated initial rotational speed value ωest0 as an initial value, an estimated rotational speed ωest so that the rotational phase angle error Δθest becomes zero, and output it.

Figure 6:
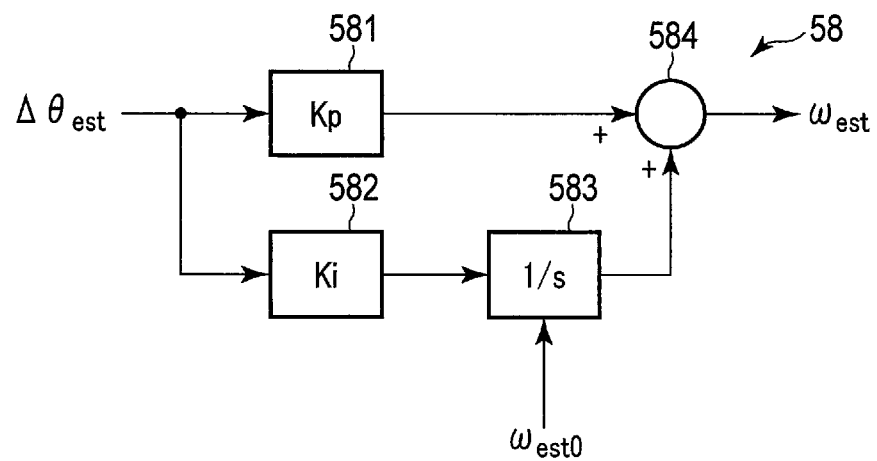
FIG. 6 is a block diagram schematically showing a configuration example of a PI controller of the regular time controller.

FIG. 6 is the block diagram schematically showing the configuration example of the PI controller of the regular time controller. The PI controller 58 is a Phase Locked Loop (PLL) circuit.

The PI controller 58 comprises a proportional gain multiplier 581, an integral gain multiplier 582, an integrator 583, and an adder 584.

The proportional gain multiplier 581 is configured to receive the rotational phase angle error Δθest, multiply it by a proportional gain Kp, and output it to the adder 584.

The integral gain multiplier 582 is configured to receive the rotational phase angle error Δθest, multiply it by an integral gain Ki, and output it to the integrator 583.

The integrator 583 is configured to integrate the output value of the integral gain multiplier 582, with the estimated initial rotational speed value ωest0 supplied from the starting time controller 4 as an initial value, and output it to the adder 584.

The adder 584 is configured to add the output value of the proportional gain multiplier 581 and the output value of the integrator 583, and output the estimated rotational speed ωest.

In other words, the estimated rotational speed ωest is calculated as follows.

$$\omega est = (Kp + Ki/s) \times \Delta\theta est \quad \text{Formula (16)}$$

Here, the initial value input to the integrator 583 is the estimated initial rotational speed value ωest0 calculated by the start time controller 4.

The integrator 59 is configured to integrate the estimated rotational speed ωest output from the PI controller 58 to calculate the estimated rotational phase angle θest. The initial value of the integrator 59 is the estimated initial rotational phase angle value θest0 calculated by the startup controller 4. The estimated rotational phase angle θest calculated by the integrator 59 is supplied to the coordinate converters 54, 56.

Here, the rotational phase angle error Δθest input to the PI controller 58 is the delta between the actual rotational speed and the estimated initial rotational speed value ωest0. Therefore, when starting the high speed rotation, and setting, when estimating the rotational phase angle/rotational speed in the rotating reference frame, the initial value of the rotational speed to zero, the control cannot follow the change in the rotational phase angle error Δθest unless the response speed of the PI controller 58 is sufficiently high with respect to the rotational speed, meaning that the estimated rotational speed ωest cannot be accurately calculated.

On the other hand, in the inverter control device and the motor drive system of this embodiment, the estimated initial rotational speed value ωest0 can be calculated more accurately even when the control response is slow, since the startup controller 4 calculates the estimated rotational phase angle value in the stationary reference frame, and calculates the approximate estimated initial rotational speed value ωest0 from the number of times that the estimated rotational phase angle value crosses zero in the predetermined period.

Further, the rotational phase angle error Δθest input to the PI controller 58 is the delta between the actual rotational speed and the estimated initial rotational speed value ωest0. Therefore, when calculating the estimated rotational phase angle θest and the estimated rotational speed ωest in the rotating reference frame in a state in which the estimated initial rotational speed value ωest0 and the actual rotational speed value approximately coincide, the estimated rotational speed can be accurately calculated without having to increase the response speed of the PI controller 58.

As described above, in the inverter control device and the motor drive system of this embodiment, even if a high-speed calculation process cannot be performed, a stable start at a high-speed rotation can be realized. In other words, according to this embodiment, an inverter control device and a motor drive system that realize a stable start can be provided.

In the above embodiment, the rotational speed estimator 46 determines whether or not the motor 2 is rotating, depending on whether or not the estimated rotational phase angle θest1 crosses zero twice or more by the predetermined period T1. This way, when the motor 2 is in a stopped state or in a state where the motor 2 is rotating at a very high speed, the time required for a start can be shortened, since the start routine for calculating the estimated initial rotational speed value ωest0 is completed within the predetermined period T1.

In the above embodiment, the rotational speed estimator 46 calculates the estimated initial rotational speed value ωest0 based on the number of times that the estimated rotational phase angle θest1 crossed zero in the predetermined periods T1, T2. However, the estimated initial rotational speed value ωest0 may, for example, be calculated from the period (period from the point at which the estimated rotational phase angle θest1 is zero (first time) to the next point at which it becomes zero (second time)) in which the estimated rotational phase angle θest1 crosses zero the predetermined number of times (for example, twice). Alternatively, the estimated initial rotational speed value ωest0 may be calculated from the behavior of the estimated rotational phase angle θest1. In either case, the estimated rotational speed value becomes approximately equal to the actual rotational speed by calculating the estimated rotational speed value using the estimated rotational phase angle value calculated in the stationary reference frame. Therefore, a stable start of the inverter control device and the motor drive system can be realized by utilizing the estimated rotational speed value calculated in the stationary reference frame as the initial value when performing sensorless control in the rotating reference frame.

Note that in the above embodiment, the synchronous reluctance motor is adopted as the motor 2. However, a similar effect can be achieved by adopting the permanent magnet synchronous motor having a small magnetic flux as the motor 2.

Further, in the above embodiment, the method of superimposing the high frequency voltage to estimate the rotational phase angle in the stationary reference frame is utilized. In the method of superimposing the high frequency voltage, since only the high frequency voltage is applied when starting, only the high frequency current flows, and the start is possible without generating a torque.

In the above embodiment, the rotational phase angle is estimated by using the high frequency current generated by superimposing the high frequency voltage. However, a similar effect can be obtained by adopting the method of estimating the rotational phase angle from the high frequency voltage applied when the high frequency current command is given and the control is performed.

FIG. 7 is the block diagram describing the other example of the startup controller for the inverter control device and the motor drive system of the above first embodiment.

In this example, a startup controller 4A comprises a high frequency current command generator 41' in place of the above high frequency voltage command generator 41, and a current controller 47. Note that configurations in the following description that are similar to those in the above first embodiment are given same reference symbols and are not further described.

The high frequency current command generator 41' is configured to generate high frequency current commands iαh*, iβh* and output them to the current controller 47.

The current controller 47 is configured to generate high frequency voltage commands vαh*, vβh* so that the difference between the high frequency current commands iαh*, iβh* and current response values iα, iβ becomes zero, and output them.

The rotational phase angle estimator 45 is configured to calculate the estimated rotational phase angle θest10 from the current response values iα, iβ output from the coordinate converter 44, and the high frequency voltage commands vαh*, vβh* output from the current controller 47.

The rotational phase angle estimator 45 is configured to utilize the above high frequency components to calculate the rotational phase angle. First, the voltage equation model of the motor 2 in the stationary reference frame is expressed by following Formula (17).

[Mathematical 15]

$$\begin{bmatrix} v_\alpha \\ v_\beta \end{bmatrix} = R \begin{bmatrix} i_\alpha \\ i_\beta \end{bmatrix} + \begin{bmatrix} L_0 + L_1\cos 2\theta & L_1\sin 2\theta \\ L_1\sin 2\theta & L_0 - L_1\cos 2\theta \end{bmatrix} \begin{bmatrix} pi_\alpha \\ pi_\beta \end{bmatrix} \quad \text{Formula (17)}$$

$$\text{wherein } L_0 = \frac{L_d + L_q}{2}, L_1 = \frac{L_d - L_q}{2}.$$

By extracting only the high frequency components from the above Formula (17), only the current differentials which can be expressed by following Formula (18) are obtained.

[Mathematical 16]

$$\begin{bmatrix} v_{\alpha h} \\ v_{\beta h} \end{bmatrix} = \begin{bmatrix} L_{00} & L_{01} \\ L_{10} & L_{11} \end{bmatrix} \begin{bmatrix} pi_{\alpha h} \\ pi_{\beta h} \end{bmatrix} \quad \text{Formula (18)}$$

In addition, the inductance matrices L00, L01, L10, L11 are expressed by the following Formula (19).

[Mathematical 17]

$$\begin{bmatrix} L_{00} & L_{01} \\ L_{10} & L_{11} \end{bmatrix} = \begin{bmatrix} L_0 + L_1\cos 2\theta & L_1\sin 2\theta \\ L_1\sin 2\theta & L_0 - L_1\cos 2\theta \end{bmatrix} \quad \text{Formula (19)}$$

Here, for example, if the high frequency current command is given only to a β-current, a α-high frequency voltage command becomes a component of sin 2θ, and the rotational phase angle value θ can be calculated. Alternatively, if the high frequency current command is given only to a α-current, a β-high frequency voltage command becomes a component of sin 2θ, and the rotational phase angle value θ can be calculated similarly.

FIG. 8 is a block diagram describing the other example of the regular time controller for the inverter control device and the motor drive system of the above first embodiment.

In this example, a regular time controller 5A comprises a high frequency current command generator 53' instead of the high frequency voltage command generator 53, and a high frequency current command superimposer 52' instead of the high frequency voltage superimposer 52.

The high frequency current command generator 53' is configured to generate high frequency current commands idch*, iqch*, and output them to the high frequency current command superimposer 52'.

The high frequency current command superimposer 52' calculates the current commands idc*, iqc* by adding the high frequency current commands idch*, iqch* to externally supplied fundamental current commands idcf*, iqcf*, and output them to the current controller 51.

The current controller 51 receives the current commands idc*, iqc* and the current response values idc, iqc, calculates the voltage commands vdc*, vqc* so that the difference between the current commands idc*, iqc* and the current response values idc, iqc becomes zero, and outputs them to the coordinate converter 54.

The rotational phase angle error estimator 57 calculates the estimated rotational phase angle error Δθest from the current response values idc, iqc and the voltage commands vdc*, vqc*.

As described above, a similar effect as in the above embodiment can be achieved by adopting the method of estimating the rotational phase angle from the high frequency voltage applied when the high frequency current command is given and the control is performed.

Next, the inverter control device and the motor drive system of the second embodiment will be described with reference to the drawings. Note that configurations in the following description that are similar to those in the above first embodiment are given same reference symbols and are not further described.

FIG. 9 is the block diagram schematically showing the configuration example of the startup controller for the inverter control device and the motor drive system of the second embodiment.

In this embodiment, a startup controller 4B and the regular time controller 5 share the PWM modulator 55, the coordinate converters 54 and 56, the rotational phase angle error estimator 57, the high frequency voltage superimposer 52, and the high frequency voltage command generator 53.

In other words, the startup controller 4B comprises the high frequency voltage command generator 53, the high frequency voltage superimposer 52, the coordinate converters 54 and 56, the PWM modulator 55, the rotational phase angle error estimator 57, and the rotational speed estimator 46.

In this embodiment, the coordinate converters 54, 56 of the regular time controller 5 are used in the startup controller 4B by setting the estimated rotational phase angle θest used for the coordinate converters 54, 56 to zero.

Further, in this embodiment, the high frequency voltage superimposer 52 of the regular time controller 5 is used in the startup controller 4B by setting the fundamental voltage commands vdcf*, vqcf* input to the high frequency voltage superimposer 52 to zero.

By setting the estimated rotational phase angle θest to zero, the estimated rotational phase angle error Δθest calculated by the rotational phase angle error estimator 57 in the startup controller 4B is set as the estimated rotational phase angle θest.

The configurations of the inverter control device and the motor drive system of this embodiment except those mentioned above are similar to the configurations in the above first embodiment, and the effects achieved are similar to those achieved in the above first embodiment.

Furthermore, since, as described above, the startup controller 4B and the regular time controller 5 share configuration, the amount of components for controlling the inverter 1 and the motor 2 can be reduced, and the configurations of the inverter control device and the motor drive system can be simplified.

Next, the inverter control device and the motor drive system of the third embodiment will be described with reference to the drawings.

Figure 10:
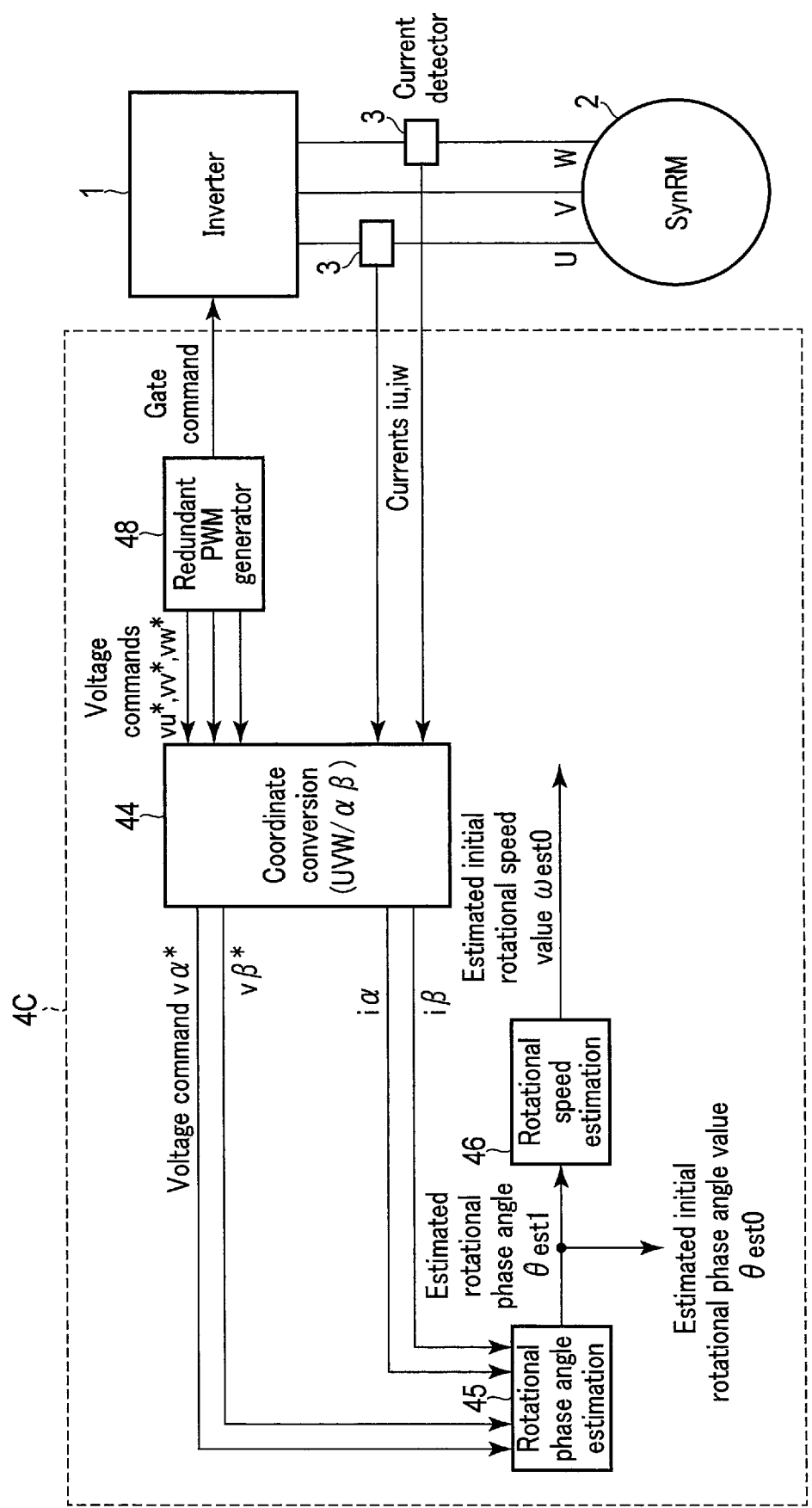
FIG. 10 is a block diagram schematically showing a configuration example of the startup controller for the inverter control device and the motor drive system of a third embodiment.

FIG. 10 is the block diagram schematically showing the configuration example of the startup controller for the inverter control device and the motor drive system of the third embodiment.

In this embodiment, a startup controller 4C comprises a redundant PWM generator 48, the coordinate converter 44, the rotational phase angle estimator 45, and the rotational speed estimator 46.

The redundant PWM generating section 48 is configured to generate the voltage commands vu*, vv*, vw*, and to output them, and further to output, based on the voltage commands vu*, vv*, vw*, a gate command to the inverter 1.

Figure 11:
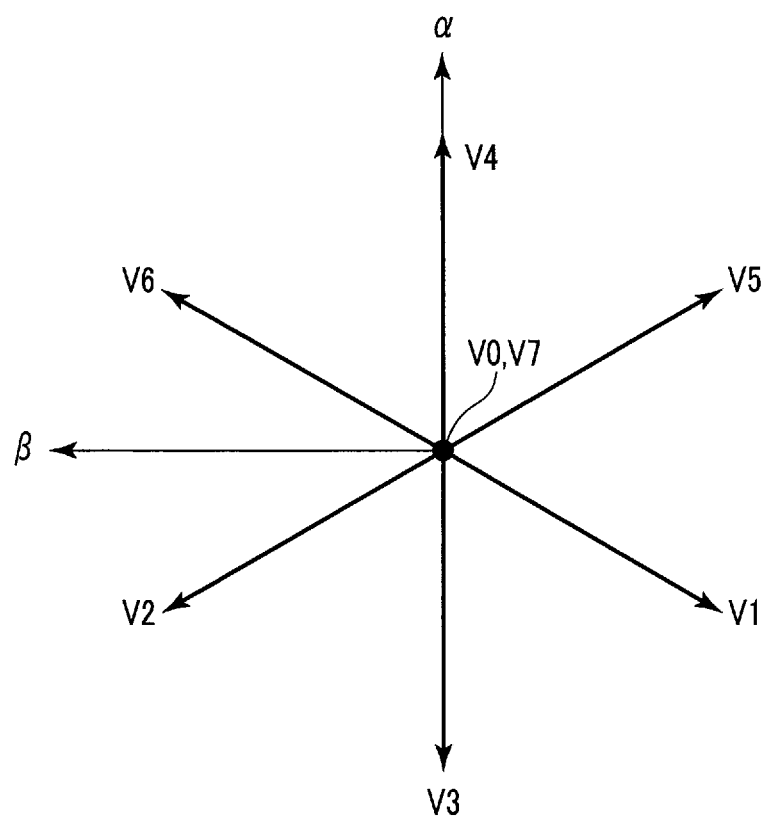
FIG. 11 is a diagram describing an example of an operation of a PWM generator shown in FIG. 10.

FIG. 11 is the diagram describing the example of the operation of the PWM generator shown in FIG. 10. FIG. 11 schematically shows eight types of voltage vectors in the αβ-fixed reference frame that can be output by the inverter 1.

In the motor 2, when the current is zero, the counter-voltage is zero, irrespective of the speed. In case of performing a general PWM modulation, when the current command is zero, a zero voltage vector of V0 or V7 is selected as the output voltage vector of the inverter.

Since, at this point, the difference between the output voltage vector and the counter-voltage becomes zero, no harmonic current is generated. On the other hand, the redundant PWM generator 48 is configured to generate a gate command so that, for example, non-zero voltage vectors V1, V6 are alternately repeated in a short time. At this point, while setting an average of the voltage vector output from the inverter 1 to zero, a harmonic current as a response of the motor 2 is generated by the non-zero voltage vector. By generating the harmonic current, the estimated rotational phase angle θest1 can be calculated by the saliency of the rotor of the motor 2.

In other words, the redundant PWM generator 48 alternately outputs, for example, the voltage commands vu*, vv*, vw* corresponding to the non-zero voltage vector V1 and the voltage commands vu*, vv*, vw* corresponding to the non-zero voltage vector V6, to the coordinate converter 44.

The coordinate converter 44 is configured to convert the voltage commands vu*, vv*, vw* in the three-phase fixed reference frame supplied from the redundant. PWM generator 48 into voltage commands vα*, vβ* in the αβ-fixed reference frame, and output them to the rotational phase angle estimator 45. Note that the voltage commands vα*, vβ* in the αβ-fixed reference frame are values corresponding to the superimposed voltage command (high frequency voltage command) output from the high frequency voltage command generator 41 in the first embodiment.

The coordinate converter 44 is configured to receive the current response values iu, iw in the three-phase fixed reference frame detected by the current detector 3, convert them into the current response values iα, iβ in the αβ-fixed reference frame, and output them to the estimator 45.

The configurations of the inverter control device and the motor drive system of this embodiment except those mentioned above are similar to the configurations in the above first embodiment, and the effects achieved are similar to those achieved in the above first embodiment.

While several embodiments of this invention have been described, these embodiments have been presented by way of example and are not intended to limit the scope of the invention. These novel embodiments can be implemented in various other forms and, as long as the spirit of the invention is not departed from, these embodiments may be omitted, substituted, or changed. The embodiments and any modifications thereof fall both under the scope of the invention and the gist thereof, and under the scope of claims and any scope equivalent thereto.

In the above first to third embodiments, the inverter control device may be configured from hardware, software, or by combining hardware and software. For example, the inverter control device may include one or more processors and a memory, and the calculations executed by each of the elements may be realized by software. In either case, a similar effect as in the above first to third embodiments can be achieved.

The invention claimed is:

1. An inverter control device comprising:
    an inverter main circuit;
    a current detector configured to detect a current of an output line of the inverter main circuit;
    a startup controller comprising a rotational phase angle estimator configured to calculate, based on a current response value detected by the current detector, a value corresponding to a rotational phase angle of a motor connected to the inverter main circuit in a stationary reference frame, and a rotational speed estimator configured to calculate a value corresponding to a rotational speed of the motor by using the value corresponding to the rotational phase angle when the inverter main circuit is started; and
    a regular time controller configured to calculate, with the value corresponding to the rotational speed as an initial value, an estimated rotational phase angle of the motor in a rotating reference frame,
    wherein the rotational speed estimator of the startup controller is configured to count a number of times the value corresponding to the rotational phase angle crosses zero in a first predetermined period, set the value corresponding to the rotational speed to zero when the counted value is less than a predetermined value, and calculate, when the counted value is at or above the predetermined value, the value corresponding to the rotational speed based on a value obtained by counting the number of times the value corresponding to the rotational phase angle crosses zero in a second predetermined period longer than the first predetermined period, and the second predetermined period.

2. The inverter control device according to claim 1, further comprising a high frequency voltage command generator configured to generate a high frequency voltage command in the stationary reference frame.

3. The inverter control device according to claim 1, further comprising:
    a high frequency current command generator configured to generate a high frequency current command in the stationary reference frame to be supplied to the motor; and
    a current controller configured to calculate a high frequency voltage command based on the high frequency current command and the current response value.

4. The inverter control device according to claim 3, wherein the rotational phase angle estimator is configured to calculate the value corresponding to the rotational phase angle of the motor based on the high frequency current command and the high frequency voltage command instead of the current response value.

5. The inverter control device according to claim 1, further comprising a PWM generator configured to generate a gate command to the inverter main circuit for causing a harmonic current to be output from the inverter main circuit and the high frequency voltage command based on the gate command.

6. The inverter control device according to claim 1, wherein the regular time controller comprises a vector converter configured to perform, based on the estimated rotational phase angle in the rotating reference frame, vector conversion of a three-phase fixed coordinate and a rotational coordinate, and wherein the vector converter performs, with the estimated rotational phase angle in the rotating reference frame set to zero when starting the inverter main circuit, a vector conversion of the stationary reference frame.

7. The inverter control device according to claim 2, wherein the regular time controller comprises a vector converter configured to perform, based on the estimated rotational phase angle in the rotating reference frame, vector conversion of a three-phase fixed coordinate and a rotational coordinate, and wherein the vector converter performs, with the estimated rotational phase angle in the rotating reference frame set to zero when starting the inverter main circuit, a vector conversion of the stationary reference frame.

8. The inverter control device according to claim 3, wherein the regular time controller comprises a vector converter configured to perform, based on the estimated rotational phase angle in the rotating reference frame, vector conversion of a three-phase fixed coordinate and a rotational coordinate, and wherein the vector converter performs, with the estimated rotational phase angle in the rotating reference frame set to zero when starting the inverter main circuit, a vector conversion of the stationary reference frame.

9. The inverter control device according to claim 5, wherein the regular time controller comprises a vector converter configured to perform, based on the estimated rotational phase angle in the rotating reference frame, vector conversion of a three-phase fixed coordinate and a rotational coordinate, and wherein the vector converter performs, with the estimated rotational phase angle in the rotating reference frame set to zero when starting the inverter main circuit, a vector conversion of the stationary reference frame.

10. A motor drive system comprising:
    the inverter control device according to claim 1, and
    a synchronous reluctance motor as the motor.

11. A motor drive system comprising:
    the inverter control device according to claim 2, and
    a synchronous reluctance motor as the motor.

12. A motor drive system comprising:
    the inverter control device according to claim 3, and
    a synchronous reluctance motor as the motor.

13. A motor drive system comprising:
    the inverter control device according to claim 5, and
    a synchronous reluctance motor as the motor.

* * * * *